March 22, 1955     E. L. POTTS     2,704,581
WELL PACKERS
Filed March 19, 1951
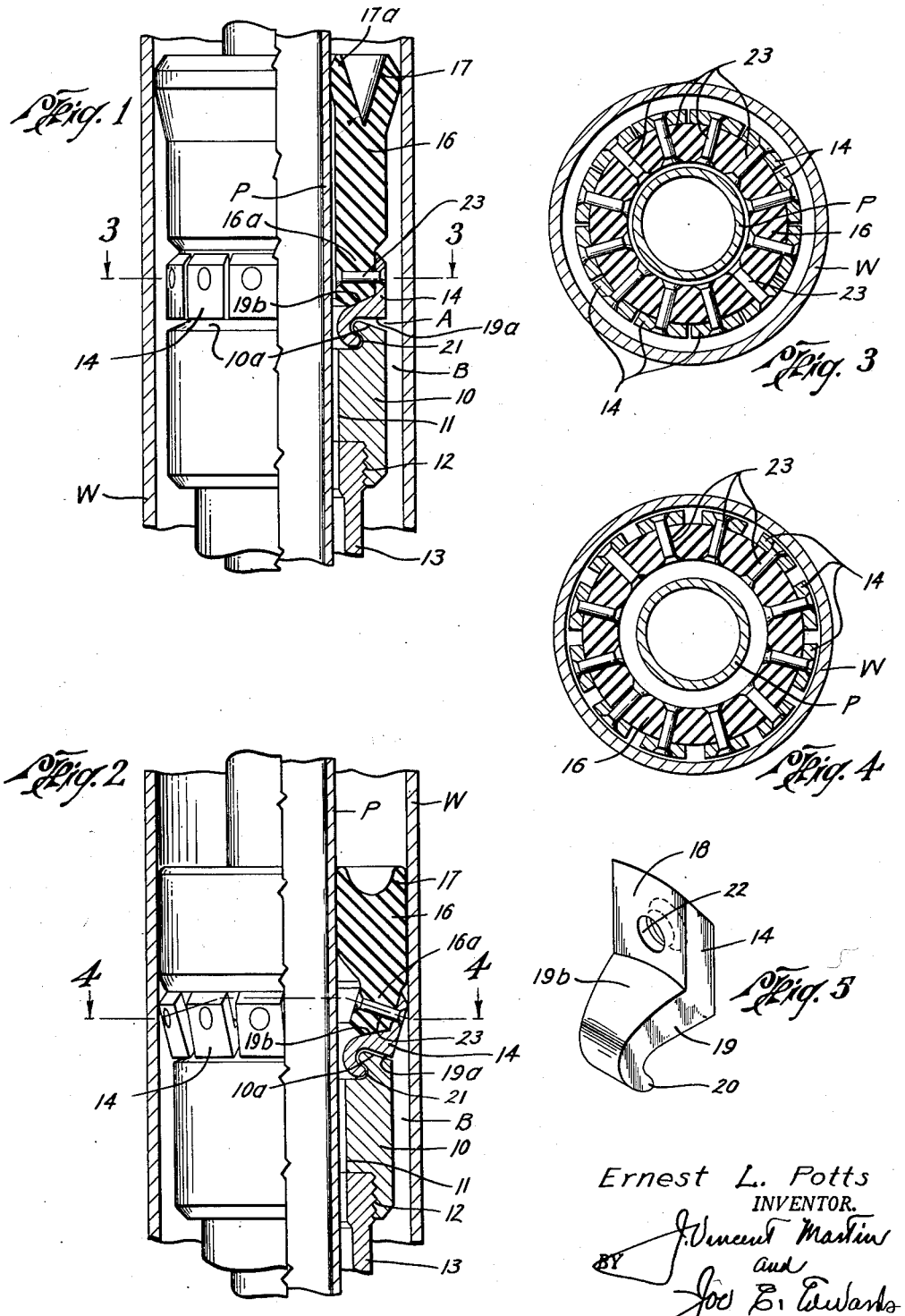
Ernest L. Potts
INVENTOR.
ATTORNEYS ed States Patent Office 2,704,581
Patented Mar. 22, 1955

2,704,581

WELL PACKERS

Ernest L. Potts, Houston, Tex., assignor to Cicero C. Brown, Houston, Tex.

Application March 19, 1951, Serial No. 216,363

2 Claims. (Cl. 166—204)

This invention relates to new and useful improvements in well packers and relates particularly to packers wherein the packing element is moved into sealing position and maintained in such position by fluid pressure.

In packers wherein fluid pressure is depended upon to expand and maintain the packing element in sealing position, it is the usual practice to provide the packing element with sealing lips which are exposed to pressure and to attach the opposite or base end of the packing element to a metallic support. Under excessive and continuous pressure against the sealing lips of the packing element, that portion of the element adjacent the metallic support may be extruded outwardly around said support, thereby resulting in damage to the packing element as well as creating a possibility of failure of said element.

It is, therefore, one object of the invention to provide an improved well packer of the pressure seal type wherein the extrusion of the base portion of the packing element around the support for the element is substantially obviated.

An important object of the invention is to provide an improved mounting for a pressure seal type of packing element wherein a plurality of segmental retaining members are attached to the base of the packing element, with means for mounting said elements to undergo outward swinging movement, whereby when the packing element is deformed due to the application of pressure, said members will swing outwardly into close proximity to the wall of the pipe being sealed to thereby close the annular space between the support for the packing element and said pipe to prevent extrusion of the packing material into said space.

A further object is to provide an improved mounting for packing elements including a supporting body or collar having a plurality of segmental sections attached to the upper portion thereof, which segments are adapted to encompass and connect with the base portion of the packing element; said mounting including an improved simplified connection between the main body and the segments whereby said segments may undergo an outward swinging movement when the packing element to which they are attached is placed under pressure.

Still another object is to provide an improved mounting for packing elements wherein the outward swinging movement of the retaining segments is positively limited so that the swinging movement which said segments may undergo is definitely limited and also whereby the pressure applied to the packing element and segments may be directly transferred to the mandrel of the packer assembly.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a view partly in section and partly in elevation of an improved well packer constructed in accordance with the invention and showing the packing element in its normal position, Figure 2 is a similar view illustrating the position of the parts when pressure is applied to the packing element, Figure 3 is a horizontal cross-sectional view taken on the line 3—3 of Figure 1, Figure 4 is a horizontal cross-sectional view taken on the line 4—4 of Figure 2, and Figure 5 is an isometric view of one of the segmental retaining members which confine the base portion of the packing element.

In the drawings, the numeral 10 designates an annular body or collar having a bore 11, the lower end of which is internally threaded at 12 whereby the body may be attached to a tubular mandrel or other element. The mandrel 13 may have connection with the usual slip assembly (not shown) whereby the mandrel and the body 10 attached thereto may be anchored within a well pipe W. The particular slip assembly and the particular manner of setting and releasing the packer is subject to variation and as an example, the present invention may be employed with a well packer of the type shown in my co-pending application Serial No. 216,546 filed March 20, 1951.

A plurality of retaining segmental members 14 which will be hereinafter described in detail are connected with the upper portion of the annular body 10, and these members confine the base portion of a packing element 16. The packing element comprises a sleeve-like annular body 16 formed of rubber or a rubber-like material and having upwardly directed sealing lips 17 and 17a at its upper end. The outer sealing lip 17 is arranged to engage the wall of the well pipe W, while the inner sealing lip 17a engages an inner pipe P, whereby the annular space between the pipes P and W is sealed off.

Each segmental member 14 is constructed as shown in Figure 5 with each member including an upright generally arcuate portion 18 and an inwardly and downwardly directed base portion 19. At the extremity of the base portion each member is formed with a curved hook 20 which is engageable within an annular recess 21 provided within the upper portion of the bore 11 of the main body 10. As is clearly shown in Figure 1 the hook 20 of each member 14 is interlocked with the recess 21.

The under side 19a of the base portion 19 of each member is normally spaced from the inclined upper surface 10a of the body 10 so that an annular space A is normally formed between the parts. The upright section 18 of each member 14 is provided with an opening 22 and when the reduced base portion 16a of the packing element 16 is confined within the member 14, suitable pins 23 passing through the openings 22 function to secure said base portion to each member. It is noted that the upper surface 19b of the base section of each member is inclined, and the lower end of the packing element is formed with a complementary incline so that said base portion seats firmly within each segmental member 14.

When all of the members 14 are assembled about and secured to the base portion of the packing element the inherent resiliency of the packing element maintains the parts in the position shown in Figure 1. In such position the hooks 20 of the segmental members are engaged within the annular recess 21 of the main body 10 and the lower surface 19a of each member is spaced from the upper inclined surface 10a of the body or collar 10.

When the mandrel 13 to which the body or collar 10 is attached is locked within the well pipe, the application of pressure to the sealing lips 17 and 17a of the element 16 will first expand said sealing lips into tight sealing engagement with the walls of the pipes P and W, and thereafter the packing element will be deformed in the manner illustrated in Figure 2.

As the pressure is applied to the element 16 to deform the same, the base portion 16a of the element will be deformed outwardly into contact with the wall of the pipe W and as this occurs the inter-engagement of the hooks 20 with the annular recess 21 will allow the upper end of each retaining member 14 to swing outwardly toward the wall of the pipe W. The outward swinging of the members 14 will continue until the under side 19a of each member engages the inclined upper end 10a of the body or collar 10, after which further swinging movement of the segmental members is halted. Any continued application of pressure to the element 16 will thereafter be directly transmitted through the segmental members 14 and body or collar 10 to the mandrel 13.

It will be evident that as the segmental members 14 swing to the position shown in Figure 2, their upper ends move outwardly into close proximity to the wall of the pipe W, and thus the members function to close the annular space, indicated at B, which would normally be present between the body or collar 10 and the pipe W. Closure of this space by the segmental members will prevent the material of the lower portion of the packing element 16 from being extruded downwardly into the annular space B. The segmental members thus form a positive backing and support for the packing element and excessive pressures applied to the element will not cause extrusion thereof with possible subsequent failures.

The particular construction of the hook 20 of each member 14 and its coaction with the annular recess 21 in the body or collar 10 provides for a simple and effective inter-lock between the parts. The segmental members are thus capable of a pivotal or swinging movement without the necessity of employing pivot pins or other types of pivotal connections. By controlling the angular disposition of the inclined surface 10a of the body or collar 10 and the angular disposition of the surface 19a of each member 14, the annular space A between the segments and the body, when the packing is in a normal undistorted position, can be controlled; it is this space which determines the amount of swinging movement which the segments will undergo before the transmission of pressure through these parts may occur, and by varying this space the members 14 may be swung any desired amount to compensate for different diameters in the well pipe W. The segments 14 function to confine and retain the base portion of the packing element to provide the necessary backing, but due to their mounting also function to close the annular space adjacent the base portion to prevent extrusion of the material of the packing element into such space. It is, of course, evident that the particular size and number of the confining and retaining members 14 is subject to variation.

The foregoing disclosure and description of the invention is illustrative and explanatory thereof, and various changes in the size, shape and materials, as well as in the details of the illustrated construction may be made, within the scope of the appended claims, without departing from the spirit of the invention.

Having described the invention, I claim:

1. In a well packer adapted to be lowered into a well pipe, a lowering pipe, an annular body surrounding said lowering pipe and movable longtudinally relative to said well pipe, means to anchor said body against movement with respect to said well pipe, an internally extending hook section on said body formed by an annular inwardly extending curved projection and an adjacent internal annular recess, an annular packing element spaced longitudinally from said body and from said hook section, a plurality of hook segments each having an externally extending hook on one end formed by an outwardly extending curved projection and an adjacent external recess, the curved projection on each of the hook segments being fitted within the internal annular recess of said hook section in contact therewith, and the curved projection on the hook section being fitted within the recesses of the hook segments in constant contact therewith so as to form a pivot contact for a pivotal swinging of said hook segments relative to said hook section, the internal surfaces of said hook segments being spaced laterally from said lowering pipe to form an annular area therebetween, a flange on the other end of each hook segment, said packing element having one end thereof connected to said flange and the other end thereof extending away from said flange and said hook segments, said one end of said packing element terminating short of said hook segments whereby the annular area between the internal surfaces of the hook segments and the lowering pipe is unrestricted by the packing element, and said flanges on said hook segments pivoting outwardly with the pivoting of said hook segments relative to said hook section upon the application of fluid pressure to said packing element to move said element from an unexpanded position to an expanded position between the lowering pipe and the well pipe.

2. The structure set forth in claim 1, wherein said hook section has a lateral surface extending from said annular curved projection thereof, and wherein each of said hook segments has a lateral surface extending from the recess thereof, the lateral surface on said hook section being inclined at an angle to the horizontal, and the lateral surface on each of the hook segments being substantially horizontal when the packing element is unexpanded and being movable upon said pivotal swinging of the hook elements into contact with said lateral surface on the hook section and substantially parallel thereto to prevent unseating of said hook segments when said packing element is expanded.

References Cited in the file of this patent

UNITED STATES PATENTS

| | | |
|---|---|---|
| 1,273,548 | Sheasley | July 23, 1918 |
| 2,295,770 | Baker | Sept. 15, 1942 |
| 2,555,647 | King | June 5, 1951 |